United States Patent
Lallouet et al.

(10) Patent No.: US 7,388,148 B2
(45) Date of Patent: Jun. 17, 2008

(54) DEVICE FOR FEEDING ELECTRICITY TO A SUPERCONDUCTIVE APPARATUS UNDER MEDIUM OR HIGH VOLTAGE

(75) Inventors: Nicolas Lallouet, Fiennes (FR); Pierre Mirebeau, Villebon S/yvette (FR)

(73) Assignee: Nexans (FR)

( * ) Notice: Subject to any disclaimer, the term of this patent is extended or adjusted under 35 U.S.C. 154(b) by 0 days.

(21) Appl. No.: 11/527,779

(22) Filed: Sep. 26, 2006

(65) Prior Publication Data

US 2008/0119077 A1   May 22, 2008

(30) Foreign Application Priority Data

Sep. 30, 2005   (FR) .................................. 05 52981

(51) Int. Cl.
*H01B 12/00* (2006.01)
(52) U.S. Cl. .................... 174/15.5; 174/15.4; 505/885; 439/181
(58) Field of Classification Search ............... 174/15.5, 174/15.4, 15.3, 19, 73.1, 721; 505/885, 886, 505/888; 439/181, 709
See application file for complete search history.

(56) References Cited

U.S. PATENT DOCUMENTS

| | | | | |
|---|---|---|---|---|
| 5,063,472 A | * | 11/1991 | van Doan et al. | 361/19 |
| 5,153,804 A | * | 10/1992 | Pham et al. | 361/19 |
| 5,382,797 A | * | 1/1995 | Kunimoto et al. | 250/352 |
| 5,857,862 A | * | 1/1999 | Muench et al. | 439/181 |
| 6,005,461 A | * | 12/1999 | Murray et al. | 335/216 |
| 6,042,407 A | * | 3/2000 | Scull et al. | 439/181 |
| 6,049,036 A | * | 4/2000 | Metra | 174/15.5 |
| 6,074,229 A | * | 6/2000 | Johansson | 439/181 |
| 6,916,213 B2 | * | 7/2005 | Nyblin et al. | 439/709 |
| 2004/0072474 A1 | * | 4/2004 | Nyblin et al. | 439/709 |

FOREIGN PATENT DOCUMENTS

EP   0780926   12/1996

* cited by examiner

*Primary Examiner*—Gary F. Paumen
(74) *Attorney, Agent, or Firm*—Sofer & Haroun, LLP

(57) ABSTRACT

A device for feeding electricity under high voltage to a superconductive apparatus is situated in a cryostat. The device comprises two bushings each comprising a first connection terminal situated outside the cryostat, and a second connection terminal situated inside the cryostat. According to the invention, the distance D between the first connection terminals is greater than the distance d between the second connection terminals, the distances D and d being sufficient to avoid electric discharge either between the first terminals or between the second terminals. Advantageously, the cryostat includes an enlargement situated above the two bushings and between them.

12 Claims, 1 Drawing Sheet

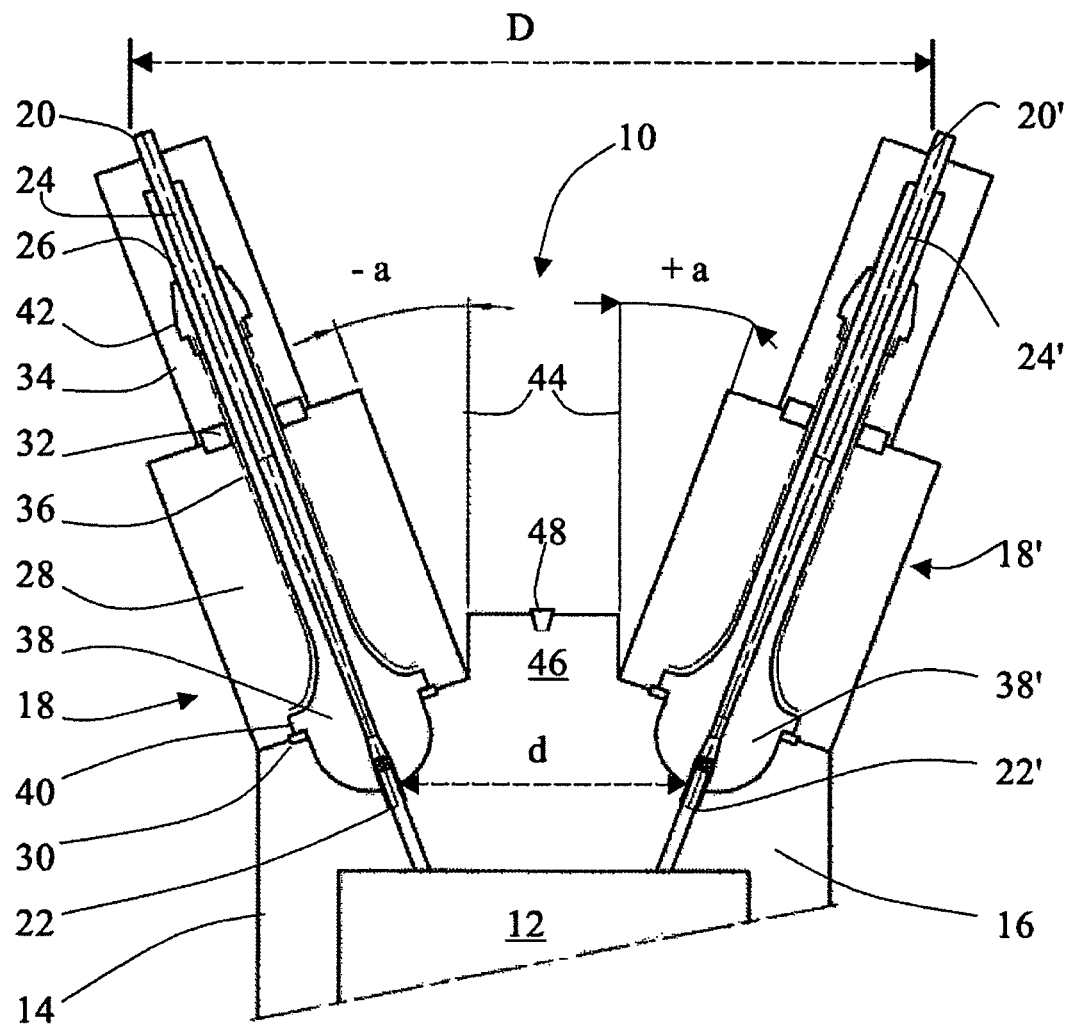
Sole figure

DEVICE FOR FEEDING ELECTRICITY TO A SUPERCONDUCTIVE APPARATUS UNDER MEDIUM OR HIGH VOLTAGE

RELATED APPLICATION

This application is related to and claims the benefit of priority from French Patent Application No. 05 52981, filed on Sep. 30, 2005, the entirety of which is incorporated herein by reference.

FIELD OF THE INVENTION

The present invention relates to a device for feeding electricity to a superconductive apparatus under medium or high voltage, where the magnitude of the current can be high.

BACKGROUND OF THE INVENTION

A superconductive element or apparatus contained in a cryostat filled with a cryogenic liquid can transport high-current electricity without losses by the Joule effect. However, in order to supply high-current electricity to the superconductive element, it can be necessary to feed it under medium or high voltage. Below, when describing the present invention, the term "medium or high voltage" is used to designate voltages greater than about 50 kilovolts (kV).

Electricity is conveyed from a source situated in ambient air, and thus at ambient temperature, to the superconductive element situated in a cryostat, and thus at cryogenic temperature, by using a feed-through device known as a "bushing", which mainly comprises a central electrical conductor surrounded by an insulating sheath. A bushing must accomplish the temperature transition over a reasonable length while ensuring that losses by thermal conduction are low so as to avoid too great a flow of heat being transmitted into the cryogenic liquid, thereby leading to it boiling. In addition, the bushing must be capable of conveying electricity at high current and it must be capable of withstanding high voltage.

In order to feed a superconductive element with electricity, it is necessary to use one bushing for current inflow and another bushing for current outflow. If the feed voltage is high, there is a risk of electrical discharge occurring between the two ends of the two bushings that are situated in the ambient air. In other words, the electric field between those two ends can become great enough to lead to an electric arc forming between the two ends that are situated in air, i.e. to a "breakdown" in air. That phenomenon occurs essentially when there is a fault in the superconductive element, or when its current-carrying capacity is exceeded, e.g. during a current surge on the network. Under such circumstances, electrical continuity between the two bushings is interrupted, at least temporarily, meaning that one of the bushings remains at the high voltage potential while the other is to be found at a potential close to ground potential. Spacing the two bushings apart by a distance that is sufficient to avoid a breakdown occurring, e.g. a distance of several meters, cannot be envisaged because of the dimensional constraints imposed on the cryostat containing the superconductive element. The size of the cryostat is limited for reasons of cost, both manufacturing cost and running cost. The present invention proposes a device that makes it possible to avoid an electric discharge appearing.

Another problem associated with feeding electricity that might be at high current and under high voltage, lies in the temperature of the cryogenic fluid being raised locally, and thus to gas forming, which might be due to a defect in the superconductive element, or more simply to the nature of said element. For example, if the superconductive element is a current limiter immersed in liquid nitrogen, the current limiter ceases to be superconductive if the magnitude of the current carried thereby exceeds a certain threshold. The current limiter then heats up by the Joule effect, thereby leading to local boiling of the liquid nitrogen, and thus to bubbles of nitrogen gas forming. Since nitrogen in gaseous form is much less electrically insulating than nitrogen in liquid form, an electric discharge can then occur within the cryostat, e.g. between the two ends of the two bushings that are situated inside the cryostat. An embodiment of the present invention provides a solution to this problem.

OBJECT AND SUMMARY OF THE INVENTION

More precisely, the present invention relates to a device for feeding electricity under medium or high voltage to a superconductive apparatus contained in a cryostat including a cryogenic liquid, the device comprising two bushings, each comprising a central electrical conductor, a first connection terminal situated outside the cryostat, and a second terminal situated inside the cryostat, the first terminals of the bushings being for connection to a source of electricity under medium or high voltage, and the second terminals of the bushings being for connection to the superconductive apparatus.

According to the invention, the distance between the first connection terminals is greater than the distance between the second connection terminals, said distances being sufficient to avoid an electric discharge either between the first terminals or between the second terminals.

In a preferred embodiment, the electrical conductors are substantially rectilinear in shape, and at least one of the conductors is inclined relative to the vertical.

In another embodiment, the electrical conductors of the bushings are substantially rectilinear in shape, one of the conductors being inclined at angle +a relative to the vertical and the other being inclined at an angle −a relative to the vertical. The electrical conductors may both be contained substantially in a single plane.

Advantageously, each of the bushings comprises in succession an enclosure at intermediate temperature between ambient temperature and cryogenic temperature, and an enclosure at ambient temperature, said central conductor passing through said enclosures and being surrounded by an electrically insulating sheath.

Preferably, an electrically conductive screen connected to ground potential surrounds the insulating sheath over a segment that extends substantially from the second connection terminal of the bushing to at least the junction between the intermediate enclosure and the enclosure at ambient temperature.

In another embodiment, the cryostat includes an enlargement in its upper portion, the enlargement being situated higher than the second terminals. Any gas present in the cryogenic liquid can rise through the liquid and then become located in the enlargement where it might possibly form a pocket of gas.

The cryostat may include a safety valve situated above the enlargement, said valve opening when the pressure of the gas present in the enlargement, if any, exceeds a predetermined value.

BRIEF DESCRIPTION OF THE DRAWING

Other characteristics and advantages of the invention appear from the following description given purely by way of example and made with reference to the drawing in which the sole FIGURE shows an embodiment of the invention.

MORE DETAILED DESCRIPTION

Firstly, it should be observed that the electric field value that leads to an electric discharge is much higher in the cryogenic liquid than it is in air. By way of example, if the liquid is nitrogen, the breakdown voltage is about 30 kilovolts per millimeter (kV/mm) to 40 kV/mm as compared with about 1 kV/mm for air (which value varies depending on several factors including temperature and air humidity). In addition, the cryogenic liquid inside the cryostat is under pressure, about 3 bars, thereby increasing the breakdown voltage in liquid nitrogen to a value close to 60 kV/mm. An electric discharge is therefore much more likely to occur between the ends of the bushings situated in air than between the ends of the bushings situated in the cryogenic liquid. The distance between these two ends in the liquid nitrogen is generally determined by the dimensions of the superconductive apparatus, and in any event is imposed by the inside dimensions of the cryostat. However, since the breakdown voltage in liquid nitrogen is much higher than the breakdown voltage in air, this distance is generally not critical. However, the same is not true of the distance between the two ends of the bushings that are situated in air. This distance must therefore be increased, within certain limits determined by acceptable overall size.

The sole FIGURE shows an embodiment of a device 10 for feeding electricity under medium or high voltage to a superconductive apparatus 12 contained in a cryostat 14 including a cryogenic liquid. The liquid is generally liquid nitrogen at a temperature of about −200° C. In conventional manner, the cryostat 14 comprises an outer wall and an inner wall, which defines a space 16 containing the cryogenic liquid. This space is thus at cryogenic temperature, which for so-called "high temperature" superconductors is about −200° C. A vacuum e.g. of about $10^{-5}$ millibars (mbar) is maintained between the two walls of the cryostat.

The apparatus 12 can be of various types, such as a current limiter or a tester, for example. The apparatus 12 is cooled by the liquid nitrogen so as to be found in a state of superconductivity.

The device 10 comprises two bushings 18 and 18', one serving for current inflow into the cryostat and the other serving for current outflow from the cryostat. Each bushing has a first connection terminal 20 or 20' at one of its two ends that is situated outside the cryostat in ambient air, and has a second connection terminal 22 or 22' at its other end situated inside the cryostat. The first terminals 20 and 20' are connected to an electricity feed and the second terminals 22 and 22' are connected to the apparatus 12.

Since the bushings 18 and 18' are identical, only the bushing 18 is described in detail.

By way of example, two embodiments of bushings suitable for medium and high voltages and for currents that might be high are described in patent applications FR 05/50694 and FR 05/50695 filed by the present Applicant on Mar. 17, 2005.

The bushing 18 comprises a central conductor 24 made of copper or of aluminum alloy, surrounded by an electrically insulating sheath 26, e.g. made of epoxy. The bottom end of the central conductor 24 that is situated inside the cryostat 14 constitutes the second connection terminal 22. The top end of the central conductor forms the first connection terminal 20.

An intermediate enclosure 28, adjacent to the cryostat 14, is preferably filled at least in part with a solid material presenting low thermal conductivity. This material may be in the form of a foam, such as a polyurethane foam or a cellular glass foam, e.g. of the kind that is commercially available under the trademark Foamglass. The central conductor 24 and the sheath 26 pass through the bottom wall of the intermediate enclosure 28 via a leaktight fastener flange 30, and through the top wall via a leaktight fastener flange 32. Above this fastener 32, the central conductor and the sheath are contained in an enclosure 34 at ambient temperature. The central conductor 24 projects from the top of the enclosure 34 to form the first connection terminal 20. The intermediate enclosure is at a temperature that lies between ambient temperature and the temperature of the cryogenic fluid.

An electrically conductive screen 36 is preferably made of metal and fits tightly around the insulating sheath 26 over at least a segment of the sheath, i.e. over a certain length thereof. This screen is advantageously implemented by metallizing the insulating sheath over said segment. The metal deposited on this outer wall may be constituted by zinc, for example, sprayed onto the outer wall of the sheath. The screen 36 extends from the bottom of the intermediate enclosure 28 slightly above the fastener flange 30, to a point at least as far as the flange 32, i.e. to the junction between the intermediate enclosure 28 and the enclosure 34 at ambient temperature. The screen is electrically connected to ground potential. Its function is to confine the electric field along the central conductor 24 solely inside the bushing, and more precisely between the central conductor 24 and the screen 36.

The bottom end of the insulating sheath 26 is terminated by a bulb 38 that includes a fastener collar 40. The portion of the bulb situated above the collar 40 presents a flaring shape with the most widely flared portion being at the collar. The flange 30 fastens the collar 40 of the bulb 38, and thus the sheath 26, in leaktight manner to the inside wall of the cryostat 14. The screen 36 covers the flared shape of the bulb 38 as far as the collar 40.

The side wall of the enclosure 34 at ambient temperature is constituted by an electrical insulator, for example glass fiber reinforced epoxy commonly referred to as "fiber reinforced polymer" (FRP). The outside surface of this wall carries a succession of fins or "sheds" (not shown) of insulating material, e.g. silicone, for the purpose of lengthening the path followed by any leakage current on its surface. The enclosure 34 at ambient temperature is filled with a liquid that is a good electrical insulator, such as silicone oil. In addition to providing good electrical insulation for the central conductor 24, the insulating liquid makes it easier to stabilize the temperature of the enclosure to ambient temperature.

A stress cone 42 situated inside the enclosure 34 at ambient temperature surrounds the sheath 26 where the screen 36 comes to an end. The stress cone 42 includes a conductive portion which is electrically connected to the screen and also to the electrically conductive leaktight fastener flange 32, e.g. via taping made up of semiconductive tapes. The screen 36 may come to an end at the fastener flange 32, or as shown in the sole FIGURE, it is extended directly as far as the conductive portion of the stress cone 42, the essential point being to provide good electrical continuity between the screen 36 and the conductive portion of the stress cone. The function of the stress cone is to deflect or flare the electric field lines where the screen comes to an end so as to avoid any discontinuity that could lead to electrical breakdown.

According to the present invention, the distance D between the two first connection terminals 20 and 22 situated in air is greater than the distance d between the two second connection terminals situated in the cryogenic liquid. In addition, the distances D and d must be greater than the distances at which electric discharge would occur respectively between the two first connection terminals or between the two second connection terminals. The minimum value for the distance D naturally depends on limiting atmospheric and electrical conditions in which the device is to be used, such as air humidity and temperature, and on maximum values for the current and the voltage that are to be applied to the superconductive apparatus. For a given voltage value, the distance D is selected so that the electric field created between said first terminals 20 and 20' is less than 1 kV/mm.

Several embodiments are possible for achieving this result. For example, when the central conductors 24 and 24' are rectilinear, as is the case for the embodiment shown in the sole FIGURE, at least one of the bushings 18 and 18' is inclined at an angle a relative to a vertical direction 44. Advantageously, both bushings are inclined relative to the vertical, the bushing 18 being inclined at an angle −a and the bushing 18' at an angle +a. The angle of inclination a may lie in the range 5° to 90°. It is possible to envisage an embodiment in which one of the bushings is at the top of the cryostat and the other on one side, the two bushings then extending substantially perpendicularly. The two central conductors 24 and 24', and by extension the two bushings 18 and 18', may be contained in a single plane. This applies to the embodiment shown, where the plane in question is that of the drawing.

The cryostat 14 preferably includes an enlargement 46 in its top portion. This enlargement is situated above the second terminals 22 and 22' and between said terminals. If bubbles of gas form inside the cryostat, the gas will rise to the surface of the cryogenic liquid and accumulate in the enlargement 46, thus forming a pocket of gas. Gas formation is generally the result of the cryogenic liquid boiling, due to the superconductive apparatus 12 heating by the Joule effect. Such heating may be localized, e.g. around the second connection terminals 22 and 22'. In which case bubbles of gas form that rise through the liquid so as to end up being trapped in the enlargement 46. The inclination of the bushings encourages the bubbles to rise. If the bushings were in a vertical position, then the bubbles of gas would tend to accumulate around the terminals 22 and 22' and the bottom portions of the bulbs 38 and 38'. This thus serves to avoid bubbles accumulating in the liquid, in particular around the second terminals 22 and 22', thus preventing an electric discharge in the cryogenic liquid. It should be observed that the location of the enlargement 46, higher than the bushings 18 and 18' and between them, does not in any way impede the operation of the device or of the cryostat. In addition, the enlargement 46 may advantageously be full of cryogenic liquid when the cryostat begins to be used, thereby increasing its overall thermal mass.

A safety valve 48, rated to a predetermined pressure, opens automatically when the pressure of the gas in the enlargement 46 exceeds the threshold pressure. This valve may be replaced by a rupture disk comprising a membrane that tears when the pressure of the gas reaches the threshold pressure.

Embodiments other than those described and shown can be devised by the person skilled in the art without going beyond the ambit of the present invention. For example, the bushings could be curved in shape rather than being rectilinear. Similarly, the particular embodiment of the bushings 18 and 18' is merely one example and other embodiments could be used, insofar as the bushings are capable of withstanding medium or high voltages.

What is claimed is:

1. A device for feeding electricity under medium or high voltage to a superconductive apparatus contained in a cryostat including a cryogenic liquid, the device comprising:
   two bushings, each having a central electrical conductor;
   a first connection terminal situated outside the cryostat; and
   a second terminal situated inside the cryostat, the first terminals of said bushings being for connection to an electricity source under medium or high voltage, and the second terminals of said bushings being for connection to said apparatus, wherein the distance D between said first connection terminals is greater than the distance d between said second connection terminals, said distances D and d being sufficient to avoid an electric discharge either between said first terminals or between said second terminals.

2. A device according to claim 1, wherein said electrical conductors are substantially rectilinear in shape, and at least one of said conductors is inclined relative to the vertical.

3. A device according to claim 2, wherein the angle of inclination a formed by said conductor relative to the vertical is an angle lying in the range 5° to 90°.

4. A device according to claim 2, wherein one of the conductors is inclined at an angle +a relative to the vertical, and the other conductor is inclined at an angle −a relative to the vertical.

5. A device according to claim 2, wherein said electrical conductors are contained substantially in a single plane.

6. A device according to claim 1, wherein said first connection terminals are situated in air, with the distance D between said first terminals being selected for a given voltage value in such a manner that the electric field created between said first terminals is less than 1 kV/mm.

7. A device according to claim 1, wherein said first and second terminals are respectively at ambient temperature and at cryogenic temperature, each of said bushings comprising in succession an enclosure at a temperature intermediate between ambient temperature and cryogenic temperature, and an enclosure at ambient temperature, said central conductor passing through said enclosures and being surrounded by an electrically insulating sheath.

8. A device according to claim 7, wherein said enclosure at intermediate temperature is filled with a solid material of low thermal conductivity.

9. A device according to claim 7, wherein an electrically-conductive screen connected to ground potential surrounds said insulating sheath over a segment extending substantially from said second connection terminal at least as far as the junction between the enclosure at intermediate temperature and the enclosure at ambient temperature.

10. A device according to claim 1, wherein the cryostat includes an enlargement in its top portion, said enlargement being situated higher than said second terminals, any gas present in said cryogenic liquid rising through said liquid and becoming located in said enlargement in which it may form a pocket of gas.

11. A device according to claim 10, wherein said enlargement is situated between said bushings.

12. A device according to claim 10, wherein said cryostat includes a safety valve situated at the top of said enlargement, said valve opening when the pressure of any gas present in said enlargement exceeds a predetermined threshold pressure.

* * * * *